UNITED STATES PATENT OFFICE.

HERMAN VON ROM, OF STUTTGART, GERMANY.

METHOD OF PRESERVING MEAT.

SPECIFICATION forming part of Letters Patent No. 699,979, dated May 13, 1902.

Application filed March 22, 1902. Serial No. 99,488. (No specimens.)

*To all whom it may concern:*

Be it known that I, HERMAN VON ROM, landowner, a citizen of the Empire of Germany, residing at 49 Augustenstrasse, Stuttgart, in the Kingdom of Würtemberg, Germany, have invented certain new and useful Improvements in Processes of Preserving Meat, of which the following is a specification.

The present invention relates to the preserving of meat in general, and particularly with regard to salted or pickled meat, tinned meat, meat preserved in skins, and to the skins themselves.

The invention consists in the addition of an infusion or extract of tea—such, for instance, as "thea Chinensis"—either to the brine or to the raw meat, or to the tin or can liquid, or to the chopped meat and the skins. In the application of the invention to salted or pickled meat this addition acts as an astringent and causes the meat fiber to contract primarily at the surface and produces insoluble combinations with the albumen and the gluten, and thereby prevents the running out of the meat-juices on the one hand and on the other assists the brine to enter and energetically permeate the meat, since the brine remains clear and pure and retains its full diffusibility during the period of pickling. As regards canned meat, the infusion of tea also operates to retain the juices in the meat and to insolubly combine with the tannic acid of the tea the glutinous matter of the meat, whereby the glutinous taste commonly incident to canned meats is avoided. The tannic acid of the tea also combines with the albumen and prevents the running out of the meat-juices during the boiling operation.

As regards meats preserved in the skins, the addition of tea tends to preserve and disinfect the skins and to harden them against external influences. It likewise prevents loss of juices when the chopped meat is salted, and by the presence of alkali prevents the formation of meat acids and tends to preserve the meat.

It will thus be apparent that with this invention the tannic, astringent, preservative, alkaline, aromatic, and tonic properties of the tea are utilized in their entirety, and for ordinary purposes other strongly antiseptic preserving agents of more or less questionable hygienic properties are unnecessary, common salt either with or without a small quantity of nitrate of potash being sufficient.

With regard to the quantity of tea to be used it may be said in general, having in view the different kinds of meat and tea, that to one liter of brine about one-quarter to one-fifth of a liter of tea infusion is used, the infusion being of the strength of one liter of water to ten grams of tea. For two and one-half kilograms of meat one liter of brine is reckoned. Expressed in dry weight this equals one gram of tea to one kilogram of meat or one part of tea to one thousand parts of meat.

I do not limit myself to these proportions, which may be varied according to circumstances.

The meat impregnated with tea in any of its various applications retains its full value and weight, its flavor, digestibility, and wholesomeness are improved, and it is more aromatic, keeps longer, is freer from disagreeable odors, and possesses greater resisting capacity to external influences than meat preserved in the ordinary manner. It yields a full quantity of broth, like fresh meat, and can be used in a great variety of ways, as fresh meat is used.

I claim as my invention—

1. A method of preserving meat which consists in impregnating it with an infusion of tea.

2. A method of preserving meat which consists in impregnating it with a brine containing tea.

3. A method of preserving meat which consists in adding an infusion of tea to the preserving liquid.

In testimony that I claim the foregoing as my invention I have signed my name in presence of two subscribing witnesses.

HERMAN VON ROM.

Witnesses:
KONRAD ZEISSIG,
ERNST ENTEMNORD.